(12) United States Patent
Kotzian et al.

(10) Patent No.: US 10,973,092 B2
(45) Date of Patent: Apr. 6, 2021

(54) MICROWAVE EQUIPMENT

(71) Applicant: Anton Paar GmbH, Graz (AT)

(72) Inventors: Heimo Kotzian, Graz (AT); Rainer Zentner, Graz (AT)

(73) Assignee: Anton Paar GmbH, Graz (AT)

( * ) Notice: Subject to any disclaimer, the term of this patent is extended or adjusted under 35 U.S.C. 154(b) by 440 days.

(21) Appl. No.: 15/934,174

(22) Filed: Mar. 23, 2018

(65) Prior Publication Data

US 2018/0302959 A1 Oct. 18, 2018

(30) Foreign Application Priority Data

Apr. 18, 2017 (EP) ..................................... 17166874

(51) Int. Cl.
| | |
|---|---|
| *H05B 6/70* | (2006.01) |
| *H05B 6/78* | (2006.01) |
| *H05B 6/72* | (2006.01) |
| *B01F 13/08* | (2006.01) |
| *H05B 6/80* | (2006.01) |

(52) U.S. Cl.
CPC ......... *H05B 6/707* (2013.01); *B01F 13/0818* (2013.01); *H05B 6/72* (2013.01); *H05B 6/78* (2013.01); *H05B 6/806* (2013.01); *B01J 2219/1248* (2013.01); *B01J 2219/1269* (2013.01)

(58) Field of Classification Search
CPC ........ H05B 6/701; H05B 6/704; H05B 6/705; H05B 6/707; H05B 6/72; H05B 6/74; H05B 6/78; H05B 6/806; H05B 6/808; B01F 13/0818; B01F 13/0827; B01J 2219/1227; B01J 2219/1245; B01J 2219/1248; B01J 2219/1233; B01J 2219/1257; B01J 2219/1266; B01J 2219/1269; B01J 2219/1272; B01J 2219/1275
USPC ....... 219/690–697, 716, 752, 753, 756, 762, 219/763
See application file for complete search history.

(56) References Cited

U.S. PATENT DOCUMENTS

| | | |
|---|---|---|
| 5,382,414 A | 1/1995 | Lautenschlager |
| 5,725,835 A | 3/1998 | Lautenschlager |
| 5,796,080 A * | 8/1998 | Jennings ................ B01J 19/126 219/697 |
| 8,383,999 B2 | 2/2013 | Kotzian et al. |

(Continued)

FOREIGN PATENT DOCUMENTS

| | | |
|---|---|---|
| DE | 10 2010 030 287 A1 | 9/2011 |
| DE | 20 2011 105 285 U1 | 1/2012 |

(Continued)

*Primary Examiner* — Hung D Nguyen

(74) *Attorney, Agent, or Firm* — Robert A. Blaha; Smith Tempel Blaha LLC

(57) ABSTRACT

An arrangement for heating a sample by microwave radiation is provided. The arrangement includes a container having an inner space for accommodating the sample and having a bottom container wall, a wave guide arranged to guide a microwave having an electric field direction, a waveguide adapter being adapted to couple the microwave from the wave guide into the inner space of the container via the bottom container wall being oriented to be different from perpendicular to, in particular substantially parallel to, the electric field vector direction.

19 Claims, 8 Drawing Sheets

(56) References Cited

U.S. PATENT DOCUMENTS

| | | | | |
|---|---|---|---|---|
| 8,969,768 B2* | 3/2015 | Kotzian | ............... | H05B 6/806 |
| | | | | 219/690 |
| 2002/0102738 A1* | 8/2002 | Jennings | ............... | H05B 6/806 |
| | | | | 219/697 |
| 2007/0029315 A1 | 2/2007 | Ishida et al. | | |
| 2010/0051612 A1* | 3/2010 | Fagrell | ............... | H05B 6/806 |
| | | | | 219/748 |
| 2010/0270291 A1 | 10/2010 | Kotzian et al. | | |
| 2015/0090710 A1* | 4/2015 | Kotzian | ............... | H05B 6/6411 |
| | | | | 219/754 |

FOREIGN PATENT DOCUMENTS

| | | |
|---|---|---|
| DE | 20 2012 004 800 U1 | 6/2012 |
| EP | 0 387 161 A1 | 9/1990 |
| EP | 1 839 741 A1 | 10/2007 |
| EP | 2 371 447 A2 | 10/2011 |
| EP | 2 638 965 A2 | 9/2013 |
| EP | 2 740 494 A1 | 6/2014 |
| EP | 2 854 478 A1 | 4/2015 |

\* cited by examiner

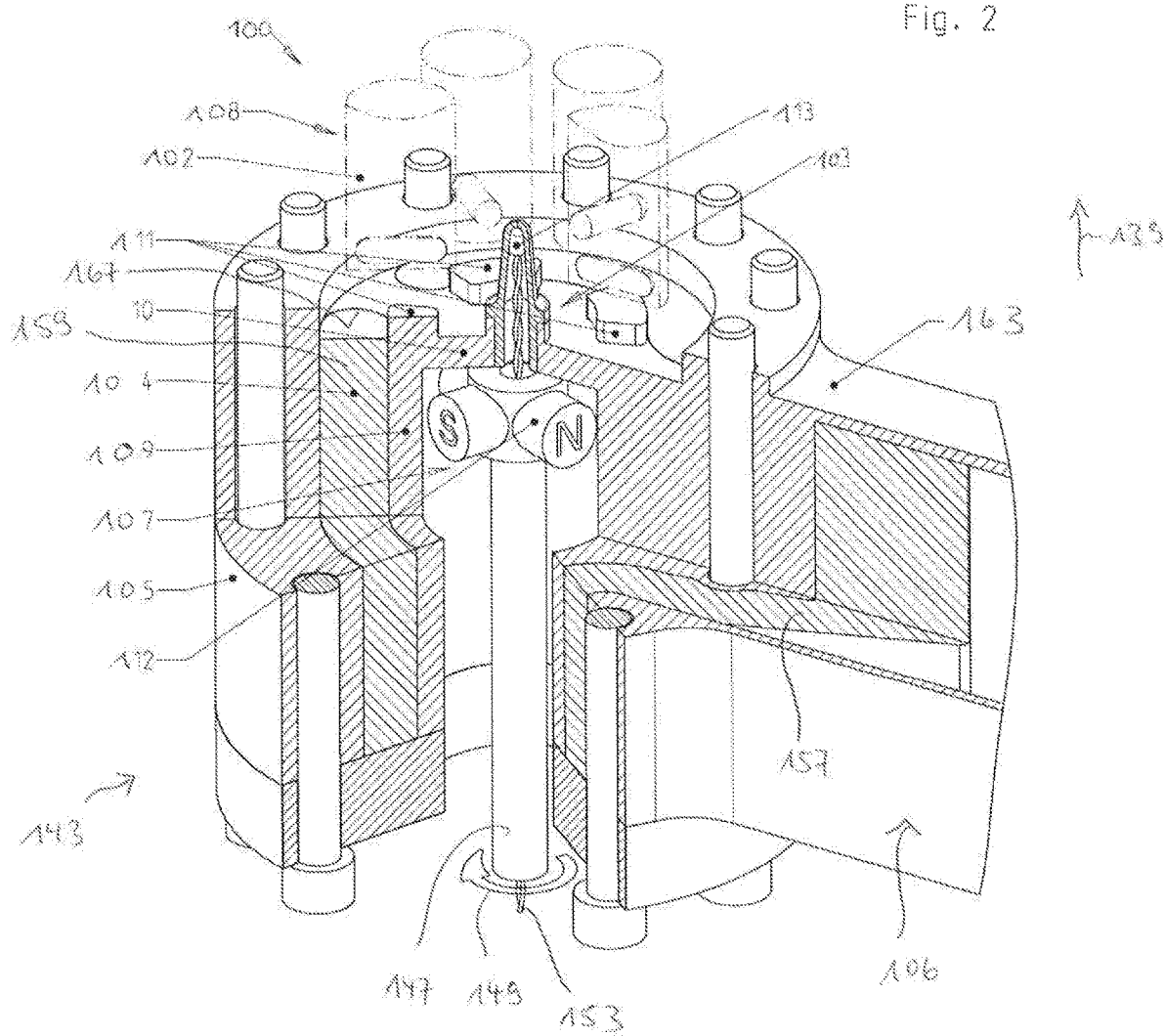

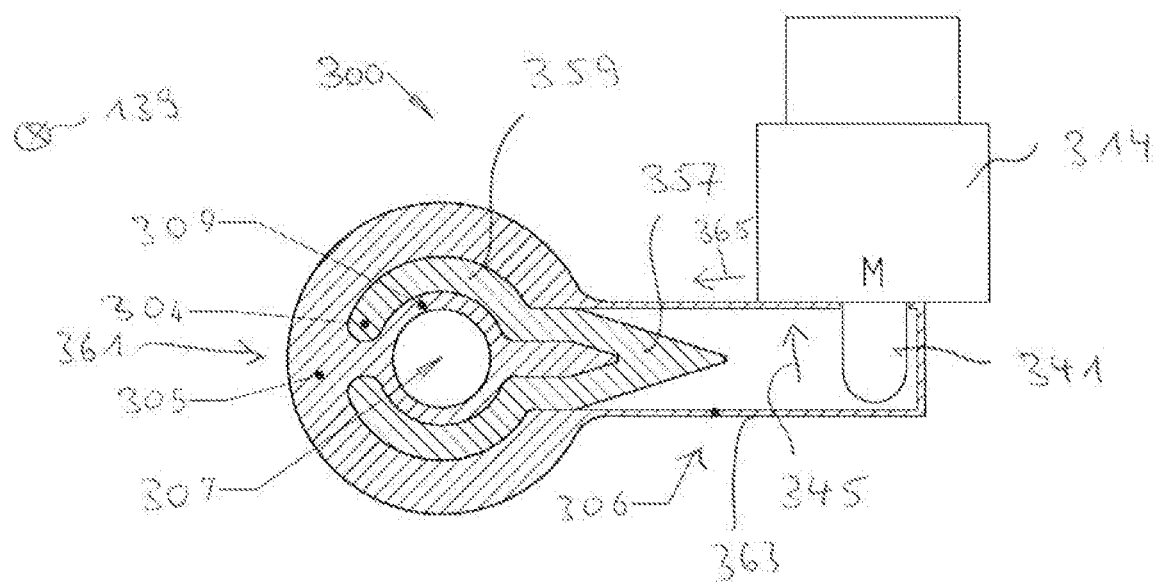
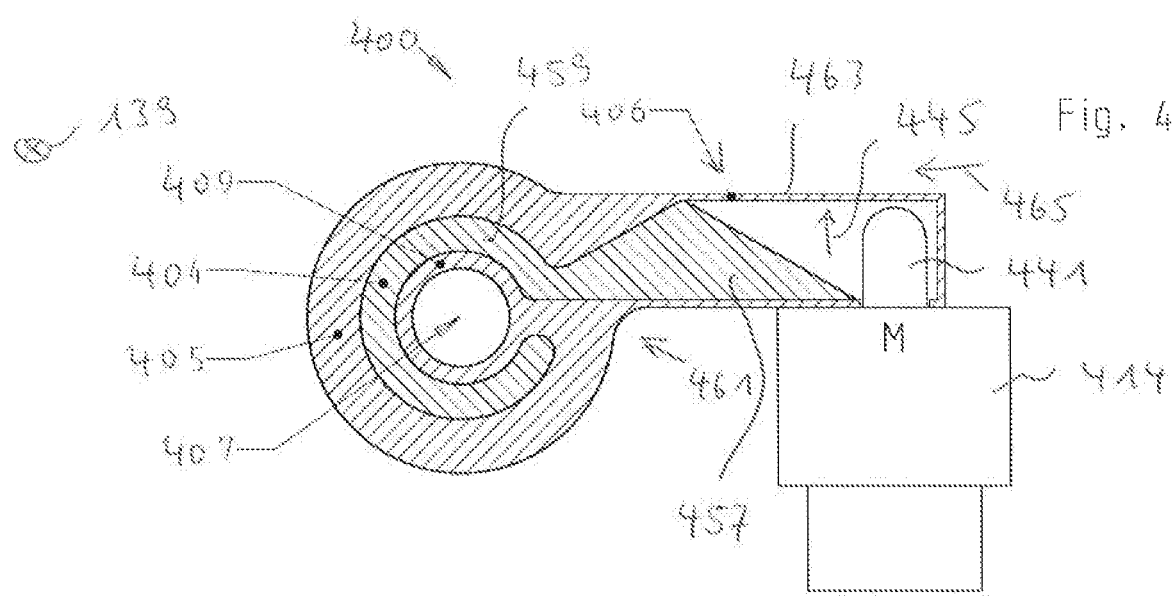

MICROWAVE EQUIPMENT

CROSS-REFERENCE TO RELATED APPLICATIONS

This application claims the benefit of the filing date of European patent application number EP 17 166 874.2, filed Apr. 18, 2017, the disclosure of which is hereby incorporated by reference in its entirety.

TECHNICAL FIELD

The present invention relates to an arrangement for heating a sample by microwave radiation.

TECHNOLOGICAL BACKGROUND

DE 20 2011 105 285 U1 discloses a pressure container for accompanying a sample to be heated, wherein the pressure container comprises a microwave transmissible region via which microwaves may be coupled into the reaction chamber. Thereby, a light guide pipe extends from the microwave transmissible region to an infrared sensor disposed external to the pressure room. A magnetron generates a microwave which is transmitted via a wave guide and which is coupled into the reaction chamber.

U.S. Pat. No. 5,725,835 discloses a device for initiating and/or promoting chemical or physical processes in a material which is heatable by a microwave heating means and thereby subjected to pressure. A magnetron emits a microwave via an antenna and a reduction element carries the microwave to a base part of a container in which the sample is placed.

EP 2 740 494 A1 discloses a microwave sterilizer for liquids, wherein two magnetrons are arranged below a resonance chamber and below a sample to be heated.

US 2010/0270291 A1 discloses a device for heating a sample by microwave radiation comprising a source of microwave radiation, a first wave guide for guiding said microwave radiation to an applicator space adapted to receive said sample to be heated, wherein said applicator space is defined by a terminal portion of said first wave guide and an initial portion of a second wave guide extending from said terminal portion of said first wave guide and being arranged at an angle with respect to said first wave guide. The first wave guide is adapted to transmit a single mode of the microwave radiation and the second wave guide is adapted to block or dampen the propagation of microwave radiation from the first wave guide into the second wave guide, if no sample is present in the portion of the applicator space. The second wave guide is adapted to improve propagation of microwave radiation from said first wave guide into said second wave guide if a sample is present in the portion of the applicator space. An antenna of the magnetron extends into the rectangular wave guide.

The conventional systems and methods for subjecting a sample to microwave radiation have disadvantages regarding possibilities to monitor a property or the state of the sample and/or to influence the sample, such as to stir the sample.

SUMMARY

Thus, there may be a need for an arrangement for heating a sample by microwave radiation, wherein an effective coupling of the microwave into a reception space is achieved, while permitting to conveniently monitor the state of the sample or the properties of the sample during the heating and/or to act on the sample, for example including mixing or stirring the sample.

The need is satisfied by the subject-matter of the independent claims directed to a heating arrangement using microwave radiation. The dependent claims specify particular embodiments of the present invention.

According to an embodiment of the present invention it is provided an arrangement for heating a sample by microwave radiation, the arrangement comprising: a container having an inner space for accommodating the sample and having a bottom container wall; a wave guide arranged to guide a microwave having an electric field direction; a wave guide adapter being adapted to couple the microwave from the wave guide into the inner space of the container via the bottom container wall being oriented to be different from perpendicular to, in particular substantially parallel to, the electric field vector direction.

The sample may be a liquid sample comprising a solvent, such as water. The sample could also be solid. The arrangement may be adapted to heat the sample to a temperature between 100° C. and 500° C., in particular up to 300° C. During heating, the sample may be subjected to a pressure between 50 bar and 400 bar, in particular between 150 bar and 250 bar. In other embodiments, the sample may be subjected to ambient pressure. Thus, the container may or may not withstand high pressures, such as a pressure up to 200 bar, in particular up to 300 bar. The container may for example comprise a steel wall. Further, the container wall may allow to be cooled by passing cooling liquid through a cooling pipe system which may be integrated within the wall of the container. The container may in particular have a substantially cylindrical shape. Thus, the bottom container wall may in particular have a circular shape. Other shapes of the bottom container wall as well as the container as a whole are possible. For example, the container may have a cuboid shape and the bottom container wall may have a rectangular shape. In particular, the bottom container wall may be arrangeable to be parallel to a horizontal direction.

Within the container, one or more samples may be accommodated, wherein the samples are accommodated in a sample container, for example in a test tube, such as a glass or plastic sample container or sample ampule. For example, 3 to 5 ampules may be placeable within the container to be heated by microwave radiation.

Within the inner space, the microwave radiation may be present when the arrangement is under operation, such that a standing wave or a travelling wave is established within the inner space. The microwave radiation may be characterized (at any spatial position) outside and inside the inner space by the direction of the electric field vector. The microwave radiation may have been generated by any available microwave generator and may have been coupled into the wave guide in which the microwave is characterized by an electric field vector direction within the wave guide. Within the wave guide, a standing wave or a propagating wave may be present when the arrangement is under operation. The wave guide may be adapted to guide the microwave within a space filled with a (gaseous) dielectric from the microwave generator toward the wave guide adapter. From the wave guide, the microwave radiation may be coupled into the wave guide adapter (which may comprise any solid dielectric material) whereupon the wavelength of the microwave radiation may change in dependence to a dielectric constant or index of refraction of the material comprised in the wave guide adapter. Furthermore, the electric field vector direction may (slightly) change upon coupling the microwave into the wave guide adapter, such that in different regions of the wave guide adapter, the electric field vector direction may be different from the electric field vector direction present in the wave guide and/or as radiated from the microwave generator. The wave guide adapter may in particular at least partly be arranged below the bottom container wall. In the region of the wave guide adapter (immediately) below the bottom container wall, the electric field vector direction may in particular be different from perpendicular to the extension of the bottom container wall. In particular, the electric field vector direction within the wave guide adapter below the bottom container wall may deviate from being parallel by for example up to 60°, in particular up to 50°, further in particular up to 40°, further in particular up to 30°, still further in particular up to 20° and still further in particular up to 10°. Substantially, the electric field vector direction within the wave guide adapter (immediately) below the bottom container wall may be substantially parallel to the bottom container wall. Thereby, an effective and efficient coupling of the microwave radiation into the inner space of the container may be achieved. In particular, no particular antenna may be necessary to couple the microwave radiation into the inner space of the container. During operation of the arrangement, a standing wave or a travelling propagating wave may be established within the wave guide adapter.

Overview of Embodiments

According to an embodiment of the present invention, the wave guide adapter has a recess below and close to the bottom container wall for accommodating equipment for monitoring at least one property of the sample and/or for actuating on and/or stirring the sample.

The recess below the bottom container wall may have any (cross-sectional) shape, such as rectangular shape, oval shape, circular shape. In particular, the recess may substantially exhibit a cylindrical shape, allowing to arrange some monitoring or actuating equipment below the bottom container wall. Within the recess, one or more sensors for sensing physical or chemical properties of the sample may be placed. Thereby, may be is achieved to monitor and/or manipulate the sample during heating the sample, thereby providing high flexibility and safety.

According to an embodiment of the present invention, the equipment comprises a permanent magnet rotatably supported in the recess for moving a mixing permanent magnet within the sample, the arrangement in particular further comprising: a rotation shaft at which the permanent magnet is fixed at least partly arranged within the recess.

The permanent magnet may be driven for example by a motor external to the inner space and external to the wave guide adapter. Thereby, the motor may be coupled to the rotation shaft. The sample container or sample ampule in which the sample is present, may also comprise a magnet stirrer on the ground of the sample container. Upon rotation of the permanent magnet, the magnet stirrer within the sample container may move or in particular rotate for stirring the sample. Thereby, a liquid sample in particular comprising one or more components may effectively be stirred and mixed during heating, for example for promoting a chemical reaction.

According to an embodiment of the present invention, the arrangement further comprises a temperature sensor, in particular thermocouple, arranged outside the inner space of the container in an inside protrusion of the bottom container wall, the protrusion protruding into the inner space of the container, the rotation shaft of the permanent magnet in particular having a longitudinal through hole through which a electrical conductor connected with temperature sensor is led.

During operation, when one or more sample containers or sample ampules are placed within the inner space of the container, a lower portion of the inner space not occupied by the sample ampule may be filled with a liquid, such as water. Thereby, a heat transfer between the sample and the additional water filled into the inner space of the container is enabled. The additional water may in turn exchange heat with the protrusion protruding into the inner space and being surrounded by the additional water. Furthermore, the protrusion may be formed by a relatively thin wall such that also heat exchange is enabled through the wall of the protrusion towards the temperature sensor. Thereby, the temperature sensor may measure a temperature from which the temperature within the sample may be derivable. In particular, it may be provided for an effective heat exchange between the sample and the temperature sensor. In particular in combination with the permanent magnet stirring equipment, no additional provisions are necessary to connect the temperature sensor electrically to external control circuitry. Advantageously, any control signals or measurement signals to or from the temperature sensor may be transmitted using the electrical conductor. Alternatively, an optical signal guiding means may be used instead or additional to the electrical conductor.

According to an embodiment of the present invention, the wave guide adapter comprises a wave guide portion made from dielectric material and adapted to guide the microwave; a shielding portion made from electrically conductive material, an inner part of the shielding portion surrounding and delimiting the recess radially outwards, an outer part of the shielding portion at least partly surrounding the wave guide portion radially outwards.

The wave guide portion may be made from any (in particular solid) dielectric material, in particular having a dielectric constant larger than that of air. The shape of the wave guide portion and also the material may be selected according to the particular application.

The inner part of the shielding portion may have substantially an annular cylindrical shape and the outer part of the shielding portion may have at least partly an annular cylindrical shape. A cylinder axis of the inner part and/or the outer part of the shielding portion may substantially be parallel or in particular co-linear with a symmetry axis (in particular cylindrical symmetry axis) of the container of the arrangement. In particular, the diameter of the inner part of the shielding portion may be smaller than a diameter of the inner space of the container. Further in particular, a (outer) extension or diameter of the outer part of the shielding portion may be greater than the diameter (or extension) of the inner space of the container.

In particular, in projection along the longitudinal axis or cylindrical axis of the container, the inner space may completely cover or overlap a respective projection of the wave guide portion. Thereby, an effective coupling of the microwave into the inner space may be enabled.

According to an embodiment of the present invention, the wave guide portion comprises an impedance matching part, in particular quarter lambda transformer or tapering part, protruding into the wave guide for receiving the microwave and comprises a container coupling part arranged below the bottom container wall for coupling the microwave into the inner space of the container.

The impedance matching part may have any shape and may be comprised of any (dielectric) material. The impedance matching part may match the impedance associated with the wave guide to the impedance of the container coupling part of the wave guide portion. Thereby, an effective transmission or propagation or coupling of the microwave into the container coupling part may be achieved. The container coupling part may be arranged immediately below the bottom container part or there may be other elements, such as a support material arranged between the lower surface of the container bottom wall and the upper surface of the container coupling part.

According to an embodiment of the present invention, the container coupling part has, in cross section parallel to the electric field direction, at least partly a shape of an, in particular circular, annulus being interrupted at least in one interruption region, the annulus having in particular an outer diameter essentially equal to a diameter of the inner space of the container.

When the annulus is interrupted, a shortcut of the microwave radiation or in general the microwave may be prohibited. When the annulus has an outer diameter essentially equal to the diameter of the inner space of the container, the microwave may be effectively, in particular comprising a good energy transmission, coupled into the inner space.

According to an embodiment of the present invention, in the interruption region the inner part of the shielding portion is joined with the outer part of the shielding portion, wherein the outer part of the shielding portion is in particular joined with a wall of the wave guide. Thereby, the shielding may be improved and manufacturing may be simplified. In particular, the inner part and the outer part of the shielding portion may be integrally formed having the same or comprising the same material. Further, in particular, the entire shielding portion and the wall of the wave guide may be integrally formed.

According to an embodiment of the present invention, the impedance matching part has a wedge shape, thickening in a direction from the wave guide towards the container coupling part, the thickness of the impedance matching part increasing to the thickness of the wave guide. Thereby, an effective impedance matching may be achieved. Other configurations are possible. In particular, the height (vertical extension) of the impedance matching part may be larger or substantially the same as the height of the container coupling part. When the height of the impedance matching part is higher than the height of the container coupling part, more energy of a microwave present within the wave guide may be coupled into the inner space of the container. In particular, the height of the wave guide may substantially be equal to a height of the impedance matching part protruding into the wave guide, even if the impedance matching part height decreases towards the container coupling part. The height of the impedance matching part may continuously or in a stepped manner decrease from the region protruding into the wave guide towards the container coupling part.

According to an embodiment of the present invention, the inner part of the shielding portion comprises at least one (conductive) field shaping element below the bottom container wall and protruding above an upper surface of an upper face of the container coupling part. The field shaping element may act to shape the microwave field below the bottom container wall for further improving the coupling of the microwave into the inner space of the container. The field shaping element may for example comprise a cuboid protrusion or a protrusion having a shape as a section of an annulus and may be integrally formed with the material of the shielding portion. The field shaping element (or in particular plural field shape elements) may be designed and arranged to be in correspondence to a shape of the container coupling part.

According to an embodiment of the present invention, between the upper face of the container coupling part and the inner part of the shielding portion on one hand and the bottom surface of the bottom container wall on the other hand a (solid) dielectric support material is arranged. The dielectric support material may be provided to withstand pressure exerted from the container bottom wall during operating the arrangement, while high pressure is prevailing within the inner space. Thereby, the container coupling part may be protected from damage.

According to an embodiment of the present invention, the wave guide has (at least partly) a cuboid shape having a first inner edge having a first length, a second inner edge having a second length, a third inner edge having a third length, wherein the second length is smaller than, in particular substantially equals half of, the first length, wherein the second inner edge substantially extends parallel to and the first inner edge substantially extends perpendicular to the electric field direction, wherein in particular the third length is larger than the first length, wherein the first inner edge extends along a vertical direction, wherein the second inner edge extends along a horizontal direction. Thereby, conventionally available wave guides are supported. In particular, the wave guide may substantially comprise a cuboid shape, in particular regarding an inside of the wave guide. Thereby, effective transmission of a microwave may be achieved.

According to an embodiment of the present invention, an extension of the wave guide adapter, in particular the wave guide portion and/or the shielding portion, is substantially equal to or smaller than the first length and essentially does have a same cross-sectional shape along a direction parallel to the first side edge, wherein the wave guide adapter, in particular the wave guide portion and/or the shielding portion, is arranged in a same vertical range as the wave guide.

The first length may be in a height direction. In particular, the first inner edge may be arranged parallel to a longitudinal axis or a cylindrical axis of the container. In particular, the first edge may be arranged vertically. The extension of the wave guide adapter along the direction of the first inner edge may be referred to as a height of the wave guide adapter. The wave guide adapter may change its height from the wave guide towards the container coupling part of the wave guide adapter. Where the wave guide adapter protrudes at least partly into the wave guide, the height of the wave guide adapter, in particular the height of the impedance matching part, may be substantially equal to the (inner) height of the wave guide. Thereby, an effective energy transmission of the microwave may be achieved. From there the height of the wave guide adapter may decrease to have a lower height in the container coupling part of the wave guide portion of the waveguide adapter.

According to an embodiment of the present invention, the arrangement further comprises at least one microwave generator, in particular magnetron, in particular having an antenna and/or conductor loop, for generating and emitting the microwave, in particular substantially having the electric field vector direction, into the wave guide.

The microwave emitted from the microwave generator may have an electric field direction which may slightly be different to the electric field vector direction present within the container coupling portion of the wave guide portion of the wave guide adapter (immediately) below the container bottom wall. However, the deviation between the electric field vector direction of the microwave as generated by the microwave generator from the electric field vector direction immediately below the container bottom wall may only be less than 50°, 40°, 30°, 20°, 10° or 5° and may substantially be parallel to the container bottom wall.

According to an embodiment of the present invention, the at least one microwave generator comprises wherein a first microwave generator and a second microwave generator for generating a first microwave and a second microwave, respectively, in particular each microwaves having the (substantially same) electric field vector direction; wherein the wave guide comprises a first wave guide and a second wave guide, wherein the wave guide adapter comprises a first wave guide adapter and a second wave guide adapter; wherein the first wave guide adapter is adapted to couple the first microwave from the first wave guide into the inner space of the container via a first portion of the bottom container wall, wherein the second wave guide adapter is adapted to couple the second microwave from the second wave guide into the inner space of the container via a second portion of the bottom container wall, wherein in particular a first assembly comprising the first microwave generator, the first wave guide and the first wave guide adapter is essentially mirror symmetric or point symmetric to a second assembly comprising the second microwave generator, the second wave guide and the second wave guide adapter. Still more than two microwave generators may be present.

BRIEF DESCRIPTION OF THE DRAWINGS

FIG. 2 schematically illustrates a portion of the arrangement illustrated in FIG. 1 in a perspective partially cut-away view;

FIGS. 3 and 4 schematically illustrate in a cross-sectional view a portion of arrangements for heating a sample by microwave radiation according to embodiments of the present invention comprising one microwave generator;

DETAILED DESCRIPTION OF EXEMPLARY EMBODIMENTS

Embodiments of the present invention are now described with reference to the accompanying drawings. The invention is not restricted to the illustrated or described embodiments.

Figure 1:
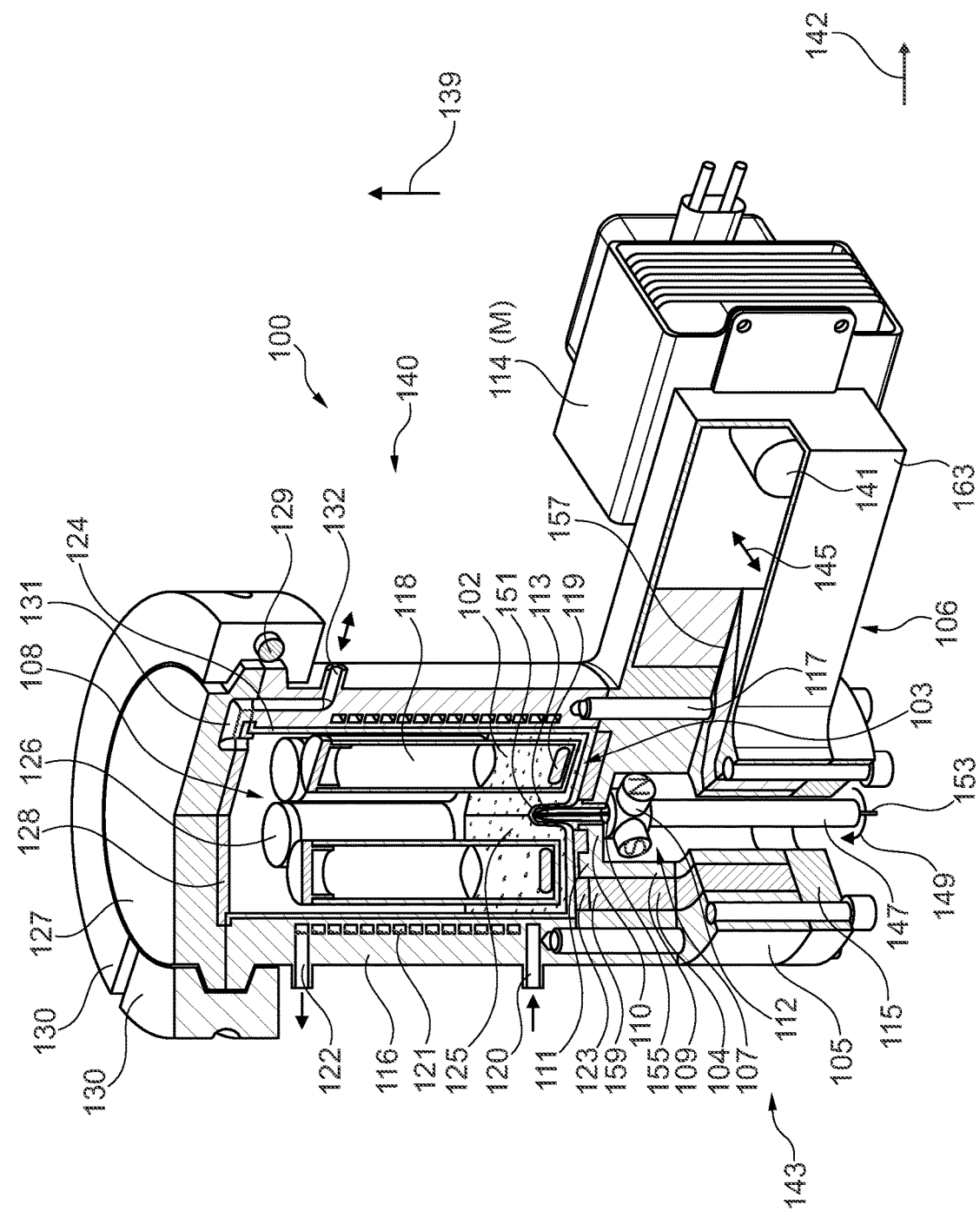
FIG. 1 schematically illustrates an arrangement for heating a sample by microwave radiation according to an embodiment of the present invention in a perspective partially cut-away view.

The arrangement 100 for heating a sample by microwave radiation illustrated in FIG. 1 in a perspective partially cut-away view comprises a container 140 having an inner space 108 for accommodating a sample 102 which is in the illustrated embodiment contained in a sample container 118, such as a sample ampule. The container 140 has a container bottom wall 103 which is arranged in a horizontal direction. The arrangement 100 further comprises a wave guide 106 arranged to guide a microwave which is in the illustrated embodiment generated by a magnetron 114 and emitted via an antenna 141. The arrangement 100 further comprises a wave guide adapter 143 which is adapted to couple the microwave from the wave guide 106 into the inner space 108 of the container 140 via the bottom container wall 103. Thereby, the bottom container wall 103 is oriented to be, in the illustrated embodiment, substantially parallel to the electric field vector direction 145, in particular below the container bottom wall 103 within the wave guide adapter 143.

The arrangement 100 and in particular the wave guide adapter 143 is configured to provide a recess 107 below and close to the bottom container wall 103 for accommodating, in the illustrated embodiment, a rotation shaft 147 at which a permanent magnet 112 (having a north pole 'N' and a south pole 'S') is fixed. The rotation shaft is rotatable, as indicated by the arrow 149, for example by an electric motor (not illustrated). The sample container 118 not only comprises the liquid sample 102, but also a stirring magnet 119 at a ground of the sample container 118. Upon rotation of the permanent magnet 112, the stirring magnet 119 is moved, in particular rotated, in order to stir and mix the sample 102.

The arrangement 100 further comprises a temperature sensor 113 which is arranged outside the inner space 108 of the container 140 in an inside protrusion 151 of the bottom container wall 103, the protrusion 151 protruding into the inner space 108 of the container 140. For supplying electric energy and/or for carrying measurement signals, the temperature sensor 113 is connected with an electrical conductor 153 which is inserted and lead through a longitudinal through-hole 155 in the rotation shaft 147.

The arrangement 100 illustrated in FIG. 1 allows to couple a microwave via the container bottom wall 103 and further enables stirring the sample and measuring the temperature of the sample. A coaxial arrangement of stirring permanent magnet and rotation shaft 147 and temperature sensor 113 is achieved. An antenna below the inner space 108 of the container 140 is not required to couple the microwave into the inner space. The microwave generated by the magnetron 114 travels along the wave guide 106 and encounters the wedge-shaped impedance matching part 157 of the wave guide adapter 143. A power divider divides the microwave in two portions. Within the conducting material 109, a microwave-free functional space 107 is formed. Thereby, the outer wall 163 of the wave guide 106 joins with the wall of the wave guide adapter 143 and is provided with bores. These bores enable the connection of the bottom base plate 115 with the pressure container wall 116 using expansion screws 117. The wave guide adapter 143 is thereby clamped between the bottom base plate 115 and the pressure container wall 116, in particular microwave tight.

At a height of the frontal face 110 of the recess 107 or functional space 107, the field shaping elements 111 are arranged which enable in the transition region of the wave guide portion 104 towards the bottom container wall 103 a directed adaptation of the field distribution within the sample space or inner space 108. The functional space or recess 107 is accessible from outside and therein it is inserted a stirring means 112. The stirring means may for example be implemented using permanent magnets which may be rotated using an appropriate driving element. They may also be configured as excitable magnet coils. In order that the rotating magnetic field generated by the permanent magnet 112 or any other magnetic field generation means is effective to move the stirring magnet 119 within the sample container 118, the functional space 107 may require a sufficient large diameter and it may be required to have the frontal face 110 as close as possible to the sample space 108. In particular, the through-hole through the rotation shaft 147 may be manufactured by applying an axial bore.

The pressure container wall 116 is equipped with a fluid cooling system. It comprises an inlet 120, a spiral coil of a fluid guiding pipe or channel 121 as well as an exit 122, where the cooling fluid may exit the spiral channel system 121. The cooling fluid may then pass through a cooling arrangement for exchanging heat absorbed from the sample. Within the inner space 108, a bucket 124 made of corrosion resistant material is placed which touches and is tightly close to the inner side of the pressure container wall 116 as well as the bottom support material 123. The bucket 124 accompanies the water load 125 as well as the sample container 118 which are closed with a lid 126. The container lid 126 is equipped at an inner side with a cover 128 made of a corrosion resistant material. A clamp lock 130 allows a fast and safe access to the sample space 108. A conduit system 131 whose access 132 is advantageously arranged at the pressure container wall, allows supply and disposal of gases (for example inert gases or reaction gases) as well as the connection of a security equipment again exceeding the pressure.

The wave guide adapter 143 is in more detail illustrated in FIG. 2 in a partially cut-away perspective view. The wave guide adapter 143 thereby comprises a wave guide portion 104 made from a dielectric material and adapted to guide the microwave. The wave guide adapter 143 further comprises a shielding portion made of electrically conductive material comprising an inner part 109 of the shielding portion surrounding and delimiting the recess 107 radially outwards. An outer part 105 of the shielding part at least partly surrounds the wave guide portion 104 radially outwards.

The wave guide portion 104 comprises an impedance matching part 157 protruding into the wave guide 106 for receiving the microwave. The wave guide portion 104 further comprises a container coupling part 159 arranged below the bottom container wall (see FIG. 1) for coupling the microwave into the inner space 108 of the container 140.

As can be taken from FIGS. 3 and 4 illustrating portions of arrangements 300, 400 for heating a sample by microwave radiation according to embodiments of the present invention, the container coupling part can be configured in different manner, for example as the container coupling part 359 as illustrated in FIG. 3 or as a container coupling part 459, as illustrated in FIG. 4 in cross-sectional views viewed along the vertical direction 139. In the embodiments illustrated in FIGS. 3 and 4, the container coupling part 359, 459 has, in cross-section parallel to the electric field direction or in a cross-section along the vertical direction 139, at least partly a shape of a circular annulus being interrupted at at least in one interruption region 361 and 461, respectively. At least in an upper portion of the container coupling part 359, 459 essentially below or essentially immediately below the container bottom wall 103, the electric field vector direction is substantially parallel to the container bottom wall and thus also parallel to the electric field vector direction 345, 445, respectively, as generated by the magnetron 314, 414, respectively.

As can also be taken from FIGS. 3 and 4, the inner part 309, 409, respectively, of the shielding portion is joined with the outer part 305, 405, respectively, of the shielding part in the interruption region 361, 461, respectively. Furthermore, the inner and outer shielding portions 309, 305 and 409, 405 are connected with an outer wall 363, 463, respectively, of the wave guide 306, 406, respectively. The impedance matching parts 357, 457, respectively, have a wedge shape, thickening in a direction 365, 465 from the wave guide 306, 406, respectively, towards the container coupling part 359, 459, respectively.

As is illustrated in FIG. 1 and also in FIG. 2, the inner part 109 of the shielding portion comprises at least one field shaping element 111, in particular several field shaping elements 111, in particular arranged at a same height and having same or different shapes. The field shaping elements 111 are arranged below the bottom container wall 103 and protrude above an upper surface 167 of an upper face of the container coupling part 159.

As can be taken from FIG. 1, between the upper face of the container coupling part 159 and the inner part 109 of the shielding portion on one hand and the bottom surface of the bottom container wall 103, a dielectric support material 123 is arranged. The dielectric support material 123 may be different from the material comprised in the container coupling part 159 of the wave guide adapter or of the wave guide portion 104 in general.

Figure 5:
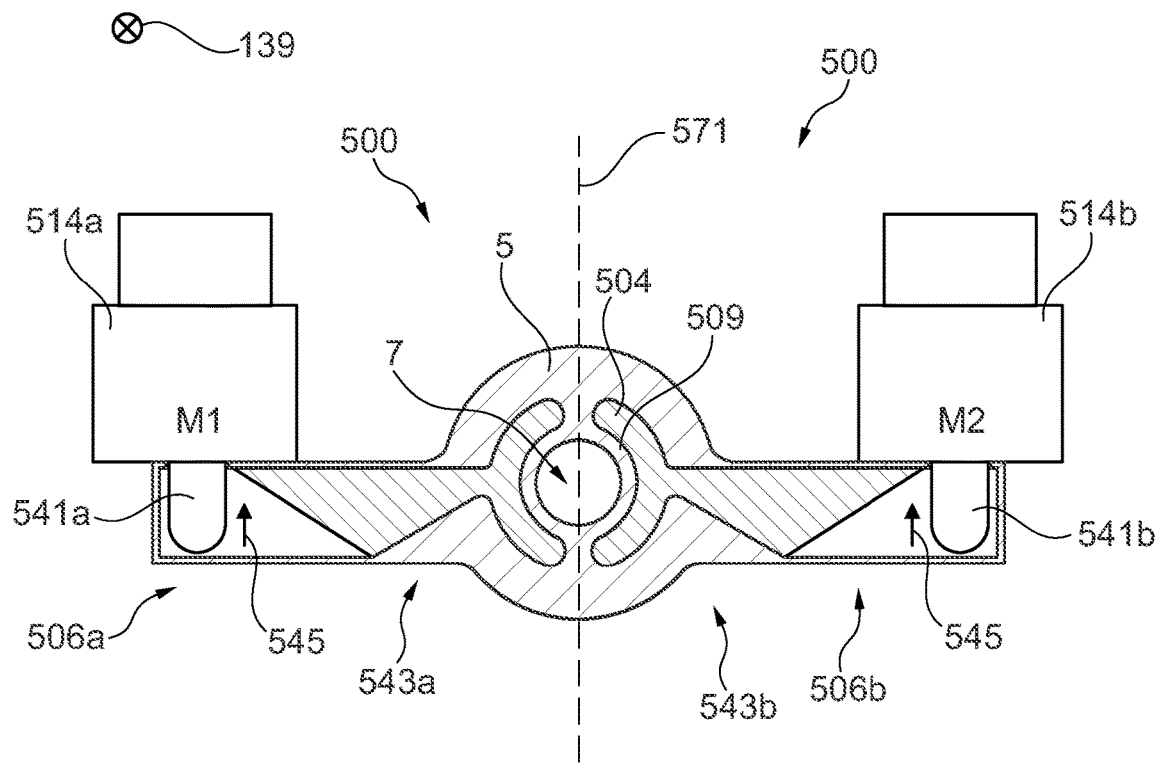
FIGS. 5 and 6 schematically illustrate in a cross-sectional view portions of arrangements for heating a sample by microwave radiation comprising two microwave generators according to embodiments of the present invention.
Figure 6:
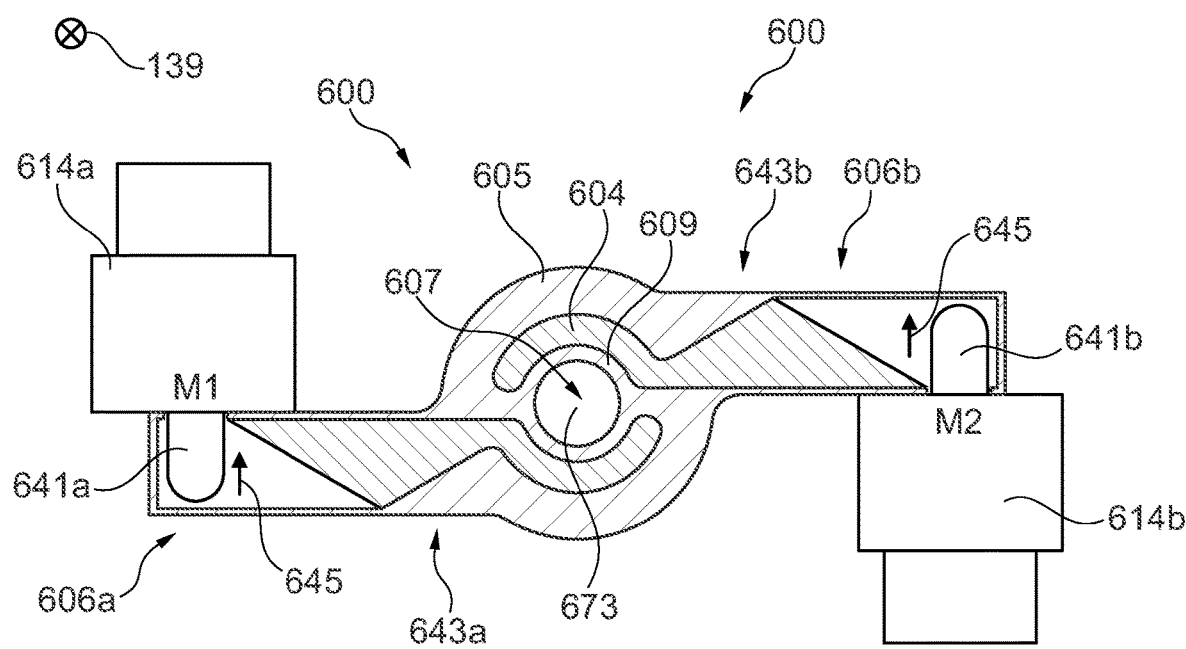

FIGS. 5 and 6 schematically illustrate in a sectional view along the vertical direction 139 portions of arrangements 500, 600 for heating a sample according to embodiments of the present invention. Therein, the arrangement 500 illustrated in FIG. 5 and the arrangement 600 illustrated in FIG. 6 both comprise a first microwave generator 514a, 614a, respectively, and a second microwave generator 514b, 614b, respectively. Both generate a microwave having an electric field direction 541, 641, respectively, substantially being perpendicular to the vertical direction 139. Further, both arrangements 500 and 600 each comprise a first wave guide 506a, 606a, respectively, and a second wave guide 506b, 606b, respectively, being adapted to guide the microwaves generated by the microwave generators. Further, both arrangements 500 and 600 comprise a first wave guide adapter 543a and a second wave guide adapter 543b and the arrangement 600 comprises a first wave guide adapter 643a and a second wave guide adapter 643b. All wave guide adapters are adapted to couple the respective microwave into the inner space of the (not illustrated) container.

Therein, the arrangement 500 is substantially mirror-symmetric having a mirror plane 571. The arrangement 600 however comprises a point symmetry (180° symmetry) with respect to the symmetry point 673 in the center of the recess 607.

Figure 7:
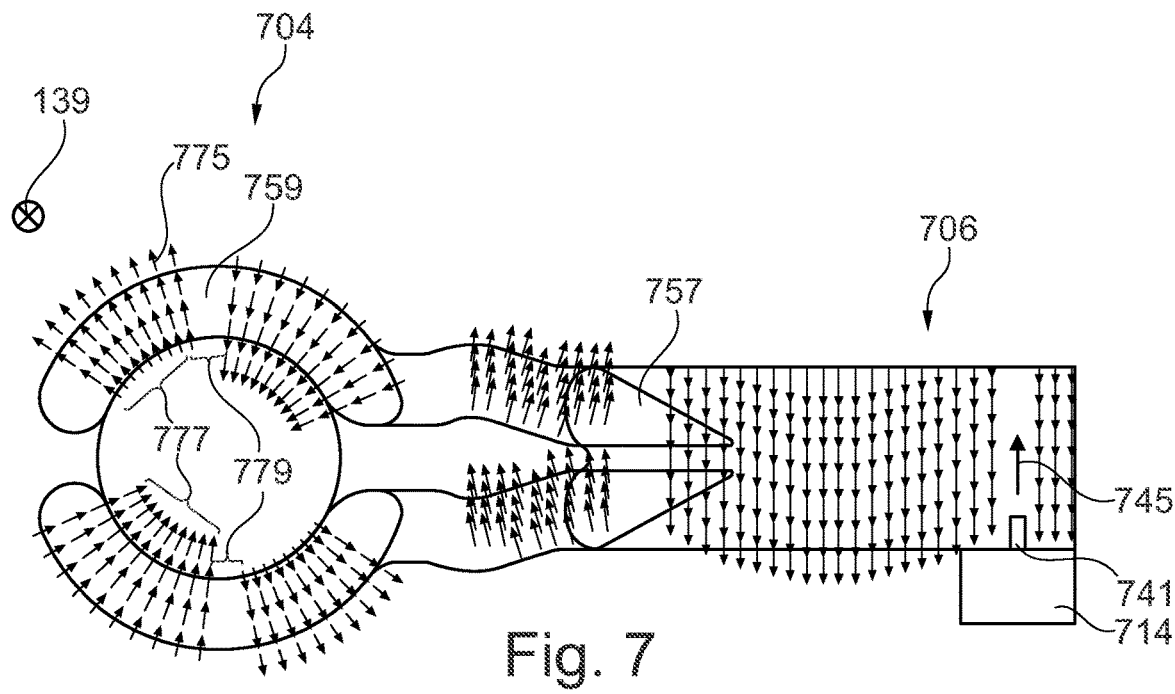
FIGS. 7 and 8 schematically illustrate electric field vector diagrams superimposed over portions of an arrangement for heating a sample by microwave radiation according to embodiments of the present invention, in a cross-sectional and in a perspective view, respectively.
Figure 8:
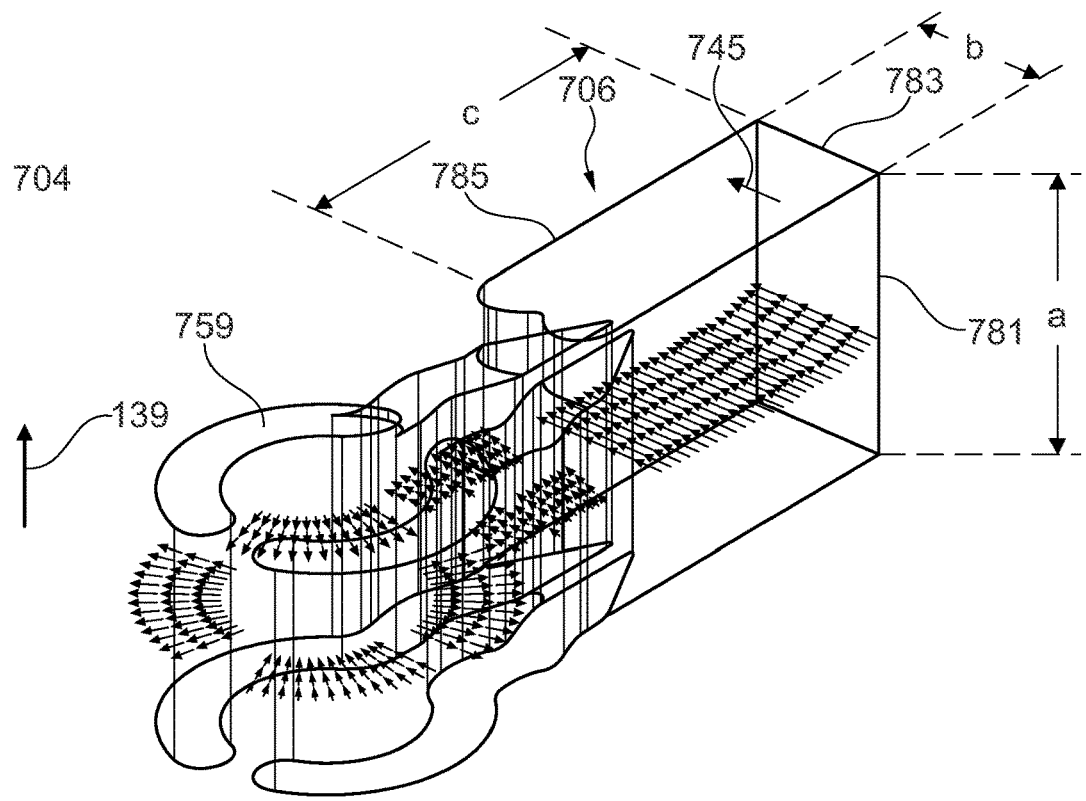

FIGS. 7 and 8 illustrate a wave guide portion 704 as used in embodiments of the present invention in a sectional view perpendicular to the vertical direction 139 in FIG. 7 and in a perspective view in FIG. 8. Furthermore, electric field vectors 775 are indicated as present in a particular point in time. In particular, a standing microwave may be generated within the wave guide portion 704 comprising regions 777 where the electric field vector varies in its amplitude in a sinusoidal manner, while in regions 779 a node of the electric field is present so that in these regions 779 no electric field is present in any point in time. As can be taken from FIG. 7 and also from FIG. 8, the electric field vectors 775 are substantially directed perpendicular to the vertical direction and thus substantially parallel to the container bottom wall when used in arrangements according to the present invention. As can also be appreciated from FIG. 7, the electric field vector direction 745 within the wave guide 706 also is perpendicular to the vertical direction 139, but the electric field vectors 745 within the wave guide adapter 143, in particular within the wave guide portion 704 and further in particular within the container coupling part 759 have different directions within a plane perpendicular to the vertical direction 139, thus are not all parallel to the direction 745. Within the wave guide portion 704, in particular below the container bottom wall the microwave has been split into four microwave portions surrounding the recess labelled in FIGS. 1 to 6 with reference sign ending with "07".

The wave guide 706 as illustrated in FIG. 8 has a cuboid shape having a first inner edge 781 having a first length 'a', a second inner edge 783 having a second length 'b' and a third inner edge 785 having a third length 'c'. In particular, according to an embodiment of the present invention, the second length 'b' is smaller than, and in particular substantially equal to half of the first rotational speed length 'a'. Herein, the second inner edge 783 substantially extends parallel to the electric field direction 745. Further, the first inner edge 781 substantially extends parallel to the vertical direction 139.

Figure 9:
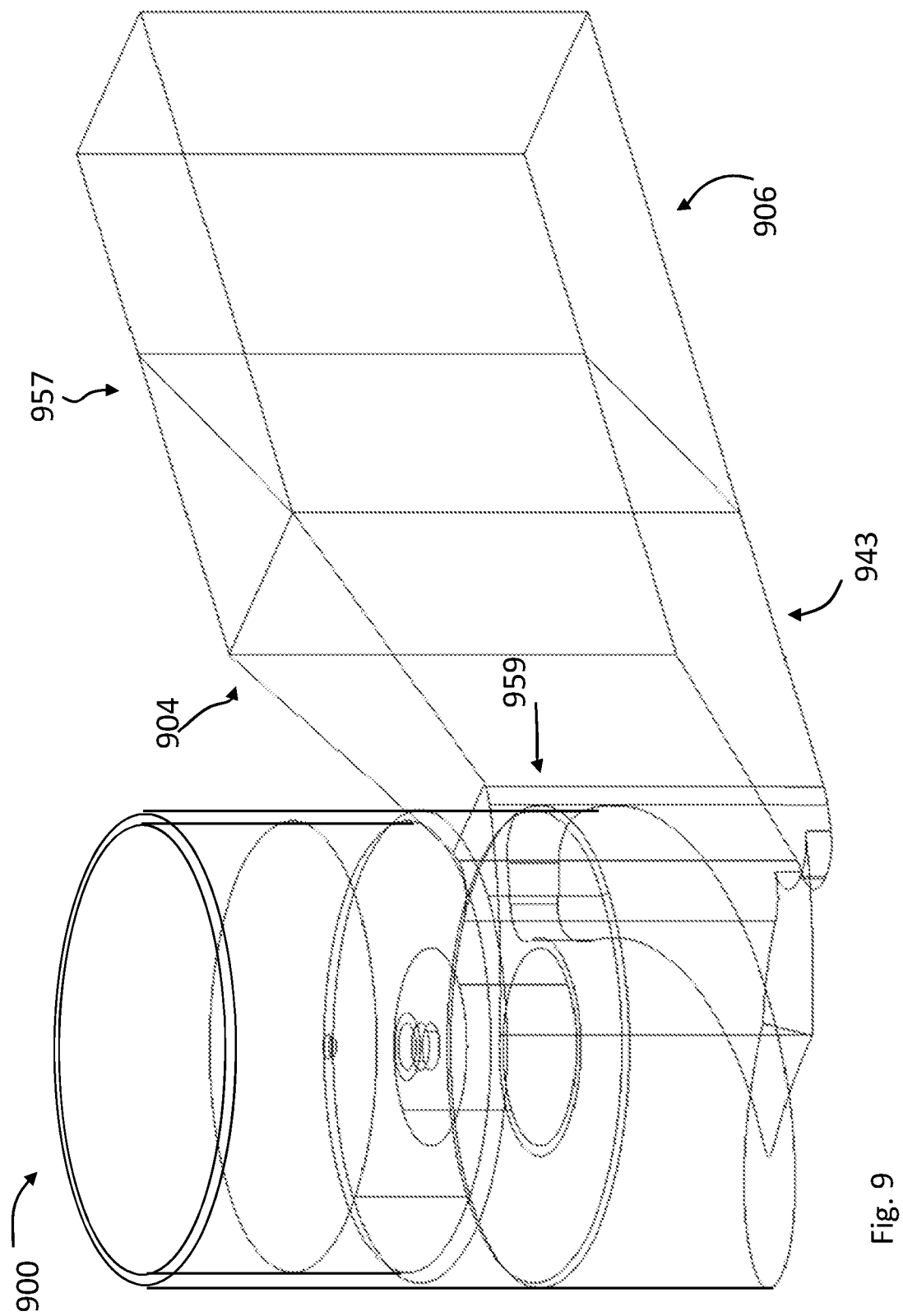
FIG. 9 schematically illustrates a portion of an arrangement for heating a sample according to an embodiment of the present invention in a perspective view.
Figure 10:
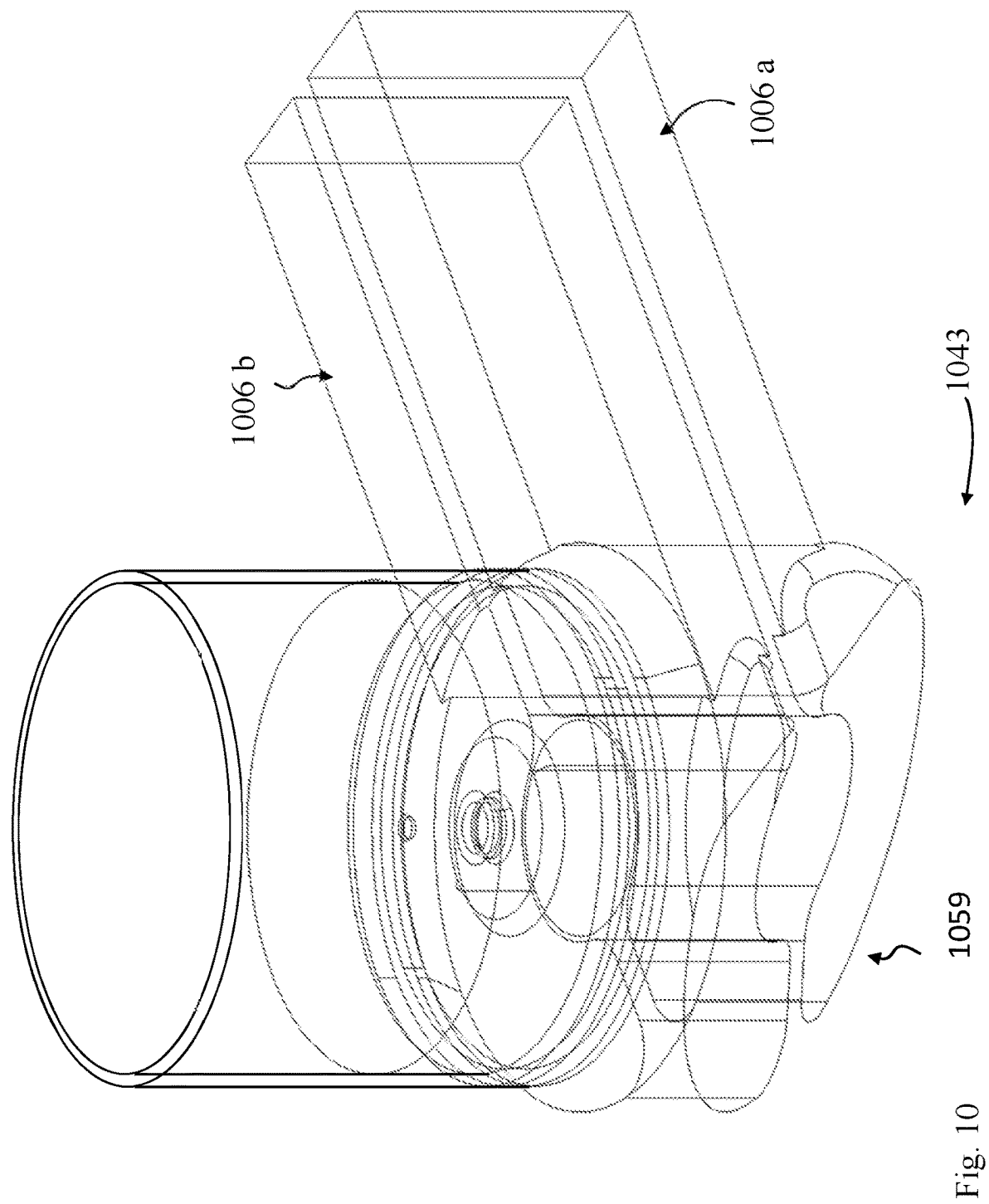
FIGS. 10, 11 schematically illustrate in perspective views of further arrangements for heating a sample by microwave radiation according to further embodiments of the present invention.
Figure 11:
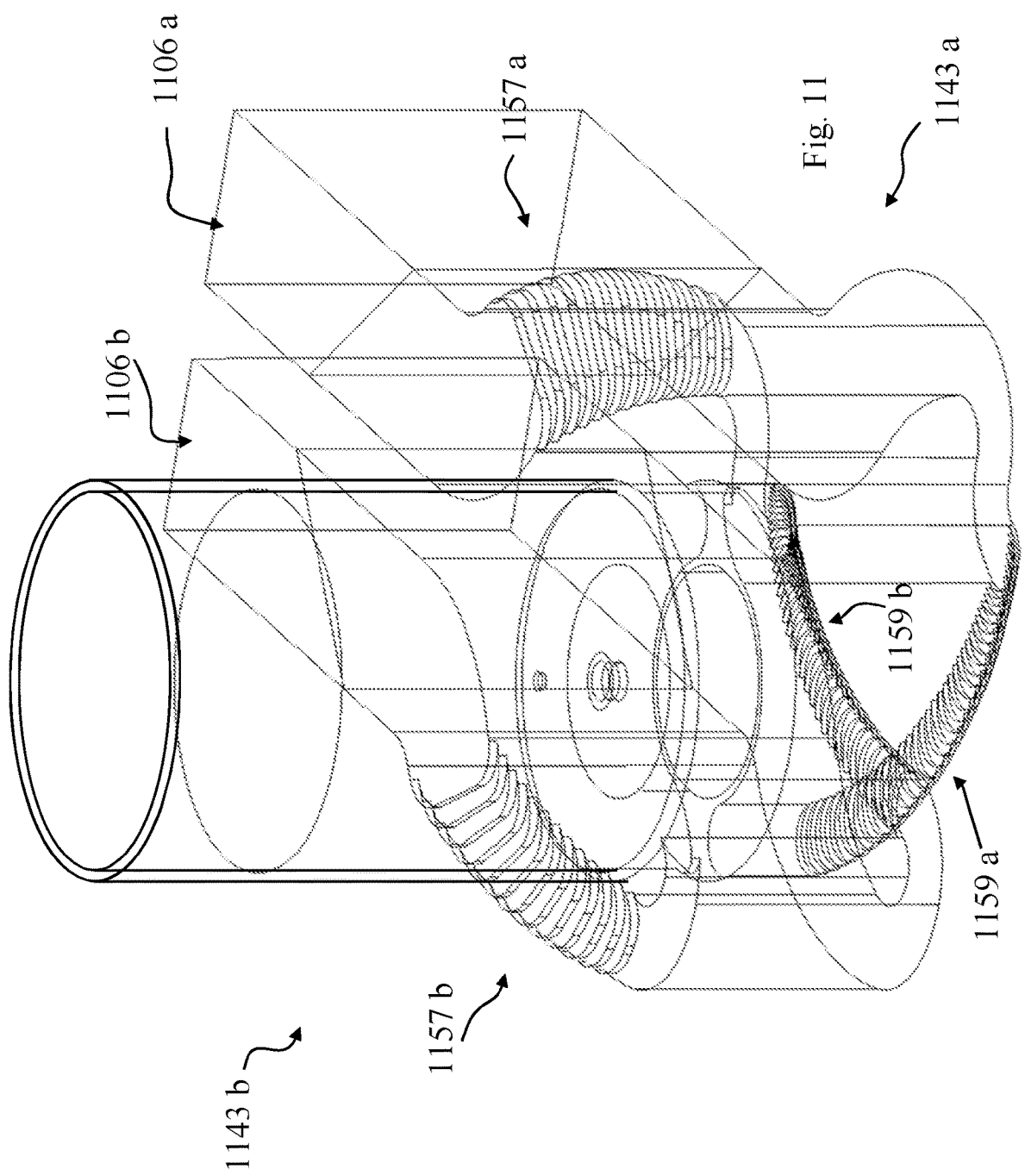

FIGS. 9, 10 and 11 illustrate in schematic perspective views further embodiments of an arrangement for heating a sample by microwave radiation. Herein, different shapes of the wave guide adapters 943, 1043 and 1143a and 1143b are illustrated.

In the embodiment as illustrated in FIG. 9, the impedance matching part 957 of the wave guide portion 104 or 904 decreases in its height towards the container coupling part 959. In the embodiment illustrated in FIG. 10, the container coupling part 1059 has a wedge type shape or tapers below the container bottom surface, in order to effectively couple the microwave into the inner space. In the embodiment as illustrated in FIG. 11 (adapted for two microwave generators), the impedance matching portions 1157a and 1157b decrease in their heights in a stepwise fashion. Further, the container coupling parts 1159a and 1159b decrease in their vertical extent also in a stepwise manner.

Elements similar in structure and/or function are labelled in the figures with reference signs differing only in the first digit. Features in one figure may be combined with features of any other figure to arrive at embodiments according to the present invention.

The invention claimed is:

1. An arrangement for heating a sample by microwave radiation, the arrangement comprising:
   a container having an inner space for accommodating the sample and having a bottom container wall;
   a wave guide arranged to guide a microwave having an electric field direction;
   a waveguide adapter being adapted to couple the microwave from the wave guide into the inner space of the container via the bottom container wall being oriented to be different from perpendicular to the electric field vector direction,
   wherein the waveguide adapter has a recess below and close to the bottom container wall for accommodating equipment for at least one of:
      monitoring at least one property of the sample;
      actuating;
      stirring the sample.

2. The arrangement according the claim 1, wherein the bottom container wall is oriented to be substantially parallel to the electric field vector direction.

3. The arrangement according the claim 1, wherein the arrangement comprises a permanent magnet rotatably supported in the recess for moving a mixing permanent magnet within the sample.

4. The arrangement according the claim 3, further comprising:
   a rotation shaft at which the permanent magnet is fixed at least partly arranged within the recess.

5. The arrangement according to claim 4, further comprising:
   a temperature sensor arranged outside the inner space of the container in an inside protrusion of the bottom container wall, the protrusion protruding into the inner space of the container.

6. The arrangement according to claim 5, the rotation shaft of the permanent magnet having a longitudinal through hole through which an electrical conductor connected with the temperature sensor is led.

7. The arrangement according to claim 1, the waveguide adapter comprising:
   a wave guide portion made from dielectric material and adapted to guide the microwave;
   a shielding portion made from electrically conductive material, an inner part of the shielding portion surrounding and delimiting the recess radially outwards, an outer part of the shielding portion at least partly surrounding the wave guide portion radially outwards.

8. The arrangement according to claim 7, the wave guide portion comprising:
   an impedance matching part protruding into the wave guide for receiving the microwave and a container coupling part arranged below the bottom container wall for coupling the microwave into the inner space of the container.

9. The arrangement according to claim 8, wherein the container coupling part has, in cross section parallel to the electric field direction, at least partly a shape of an annulus being interrupted at least in one interruption region.

10. The arrangement according to claim 9, wherein in the interruption region the inner part of the shielding portion is joined with the outer part of the shielding portion.

11. The arrangement according to claim 10, wherein the outer part of the shielding portion is joined with a wall of the wave guide.

12. The arrangement according to claim 8, wherein the impedance matching part has a wedge shape, thickening in a direction from the wave guide towards the container coupling part, the thickness of the impedance matching part increasing to the thickness of the wave guide.

13. The arrangement according to claim 7, wherein the inner part of the shielding portion comprises at least one field shaping element below the bottom container wall and protruding above an upper surface of an upper face of the container coupling part.

14. The arrangement according to claim 13, wherein between the upper face of the container coupling part and the inner part of the shielding portion on one hand and the bottom surface of the bottom container wall on the other hand a dielectric support material is arranged.

15. The arrangement according to claim 1, wherein the wave guide has a cuboid shape having a first inner edge having a first length, a second inner edge having a second length, a third inner edge having a third length, wherein the second length is smaller than the first length, wherein the second inner edge substantially extends parallel to and the first inner edge substantially extends perpendicular to the electric field direction, wherein the first inner edge extends along a vertical direction, wherein the second inner edge extends along a horizontal direction.

16. The arrangement according to claim 15, wherein an extension of the waveguide adapter substantially is not greater than the first length and essentially has a similar cross-sectional shape along a direction parallel to the first inner edge.

17. The arrangement according to claim 1, further comprising:

at least one microwave generator having at least one of an antenna and a conductor loop for generating and emitting the microwave into the waveguide.

18. The arrangement according to claim 17, wherein the at least one microwave generator comprises a first microwave generator and a second microwave generator for generating a first microwave and a second microwave, respectively each of the first microwave and the second microwave having the electric field vector direction;

wherein the wave guide comprises a first wave guide and a second wave guide, wherein the waveguide adapter comprises a first waveguide adapter and a second waveguide adapter;

wherein the first waveguide adapter is adapted to couple the first microwave from the first wave guide into the inner space of the container via a first portion of the bottom container wall, wherein the second waveguide adapter is adapted to couple the second microwave from the second wave guide into the inner space of the container via a second portion of the bottom container wall.

19. The arrangement according to claim 18, wherein a first assembly comprising the first microwave generator, the first wave guide and the first waveguide adapter is essentially one of:

mirror symmetric and point symmetric to a second assembly comprising the second microwave generator, the second wave guide and the second waveguide adapter.

* * * * *